Patented Feb. 19, 1952

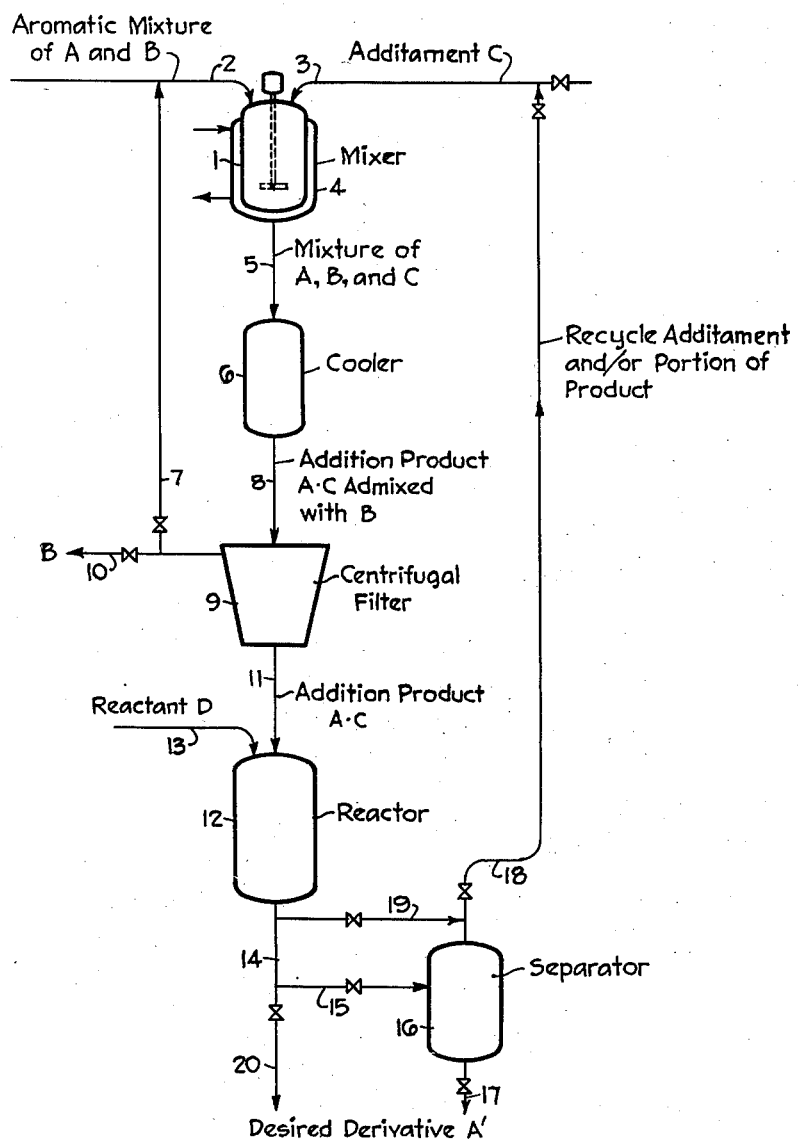

2,586,070

UNITED STATES PATENT OFFICE 2,586,070

PROCESS FOR PRODUCING PHENOLIC DERIVATIVES

Daniel B. Luten, Jr., and Aldo De Benedictis, Berkeley, Calif., assignors to Shell Development Company, San Francisco, Calif., a corporation of Delaware Application November 3, 1947, Serial No. 783,832

13 Claims. (Cl. 260—624)

1

This invention relates to a novel process for the production of derivatives of aromatic organic compounds, and to novel compounds produced by said process.

In general, aromatic compounds are easily obtainable from natural or synthetic sources as components of mixtures of closely related compounds, such as mixtures of isomers. In order to prepare derivatives from an aromatic compound contained in such a mixture, it is customary first to separate the aromatic compound from the mixture and then to treat or react it to form the desired derivative. An alternative method is to treat or react the mixture of materials to form the desired derivative, which is then separated from the reaction mixture. Both of these processes, however, in some instances are extremely difficult and uneconomical. In the first method, for example, it may be practically impossible to separate the aromatic component, at least by ordinary procedures, while in the latter method, compounds other than the desired derivative are usually produced, which consumes the reactants to no advantage and frequently leaves a difficult problem of separation of the desired derivative. As illustrative of aromatic mixtures wherein the separation of the components presents unusual difficulties are mixtures of the isomers of cresols, xylenols, xylenes, dimethyl naphthalenes, toluidines, xylidines and picolines.

It has now been found that aromatic derivatives may be produced economically, conveniently, and in good yield from multi-component systems containing as a component thereof the aromatic compound to be treated to form the desired aromatic derivative, by mixing said multi-component system with a material capable of forming an addition compound with said aromatic compound, separating the resulting addition product from the other substances of the admixture, treating or reacting the addition product so as to prepare the desired derivative of the aromatic compound, and recovering said aromatic derivative.

A preferred embodiment of the present invention contemplates the formation of an addition product wherein one component thereof is identical with the desired aromatic derivative, and the other component is the aromatic compound to be treated to form the desired derivative thereof, separating the addition product from the reaction mixture, and treating the addition product to produce the desired aromatic derivative in substantially pure form. The product may be

2 divided, part being recycled to produce more of the addition product, and part being taken as the final product.

Another preferred embodiment of the present invention contemplates the formation of an addition product wherein one component thereof is the aromatic compound from which the desired derivative may be prepared, while the other component is a material which emerges from the process substantially unchanged, and, after separation of the desired derivative, may be recycled in the process.

A still further preferred embodiment of the present invention contemplates the formation of an addition product wherein one component thereof is again the aromatic compound from which the desired derivative may be prepared, while the other component is a material which also forms a valuable derivative during the reaction.

The present invention is especially advantageous where the aromatic compound, from which the desired derivative may be prepared, is a component of a mixture of materials from which it cannot be separated except by difficult, laborious and uneconomical methods. For example, if it is desired to prepare 2,4-dimethyl-6-tertiary-butylphenol from 2,4-xylenol, which is usually a component of a multi-component system of phenols containing 2,4-xylenol, 2,5-xylenol and 2,3-xylenol, it has heretofore been necessary to separate the 2,4-xylenol and to subsequently butylate the separated 2,4-xylenol, or to butylate the mixture of materials and then recover the desired product from the reaction mixture. These methods are difficult and uneconomical. In the first method, it is practically impossible to separate 2,4-xylenol from the mixture of materials by ordinary methods because the boiling points of the various components are identical, or practically identical, and therefore it is necessary to resort to unusual, difficult and uneconomical processes. In the second method, where the mixture of xylenols is butylated prior to separation, a mixture of products is obtained, whereby a major portion of the butylating agent, such as isobutylene, may be wasted by the formation of by-products, and the separation of the desired product from the mixture remains difficult. According to the present invention, these difficulties are overcome in this instance by adding 2,4-dimethyl-6-tertiary-butylphenol to the mixture of xylenols and forming an addition product of 2,4-dimethyl-6-tertiary-butylphenol with 2,4-xylenol, as hereinafter described, separating the addition product from the remaining mixture, and treating the addition product under alkylating conditions with a butylating agent, thereby butylating the 2,4-xylenol content of the addition product to obtain substantially pure 2,4-dimethyl-6-tertiary-butylphenol. Part of the product may be recycled to produce more addition product and part taken as the final product. This process, which illustrates a preferred embodiment of the present invention and which is more fully described hereinafter, provides a simple and economical process for the production of aromatic derivatives from multi-component systems including as a constituent thereof the aromatic compound to be treated, which process obviates the objections to heretofore known methods, as above-described.

The existence of addition products between different aromatic compounds, and between aromatic compounds and other materials, such as the addition products of phenol and alpha naphthylamine, phenol and para toluidine, and phenol and meta cresol has been recognized heretofore. Such compounds (i. e., compounds of association) or adducts may be considered as products of physical association between molecules, as contrasted to the compounds formed by chemical reaction wherein the identities of the reactants are lost in the formation of the new product. Such addition products, however, have heretofore largely been considered merely as laboratory curiosities, being prepared usually from the two pure components, or from simple mixtures, and their use restricted to simply the separation of the addition product and recovery of the two components therefrom.

In many instances, the formation and separation of addition products in accordance with the present invention provides new compositions of matter which are useful and novel per se, but the principal object of the invention, in addition to the production and separation of addition products, is the treatment or reaction of the addition products to form a desired derivative of the aromatic component or components of the addition product. This procedure, as provided by the present invention, possesses many advantages over the processes heretofore taught, as above-described. The main use of the addition products produced in the process of the present invention is to provide for the preparation of the desired aromatic derivative, but other uses include the separation of a specific component from a multi-component mixture, from which the individual components may then be separated, usually by distillation. A still further advantage is in the ease of handling a solid product instead of two normally liquid materials, whenever the two components may be employed in a single process or operation.

In the preparation of 2,4-dimethyl-6-tertiary-butylphenol, as hereinbefore described, which illustrates a preferred embodiment of the present invention, it has been found that various amounts of 2,4-dimethyl-6-tertiary-butylphenol may be added to mixtures of xylenols to produce the addition product between it and 2,4-xylenol. It is believed, in this instance, that one of three addition products, wherein the mol ratios of the components are 1:2, 1:1 and 2:1, respectively, may be formed. In general, it is preferred to add sufficient 2,4-dimethyl-6-tertiary-butylphenol so that the quantity thereof present is about one mol per mol of 2,4-xylenol. However, more or less may be added, and good results achieved therewith. After mixing the 2,4-dimethyl-6-tertiary-butylphenol with the mixture containing 2,4-xylenol, the admixture preferably is heated to above the melting point of the addition product, in this instance to above about 46° C., and the mixture then cooled, or allowed to cool, whereupon a solid addition product separates, which may be filtered or removed by any convenient means. In some instances it is unnecessary to heat the mixture, cooling being sufficient to cause crystal formation, but it is generally preferable to first heat since the resulting crystals may be more readily filterable. In general, the system consists of a homogeneous liquid phase until formation of the addition product commences. It is sometimes desirable to add a small quantity of seed crystals of the addition compound to the mixture to aid crystal formation. The presence of an inert liquid diluent may in some instances aid crystal formation and subsequent separation from the system. Of course, the materials may be heated before mixing, followed by mixing and cooling, as described. The separated addition product, consisting of 2,4-dimethyl-6-tertiary-butylphenol and 2,4-xylenol, may then be butylated to produce essentially pure 2,4-dimethyl-6-tertiary-butylphenol. Butylation may be accomplished by any convenient means, such as by melting the addition product and reacting with isobutylene preferably in the presence of a small amount of an alkylation catalyst such as sulfuric acid, or by dissolving the addition product in an inert solvent and butylating. The product is essentially pure 2,4-dimethyl-6-tertiary-butylphenol, and may be divided, part being taken as the product and part being recycled to form more addition product with 2,4-xylenol. Similarly, 2,4-xylenol may be converted to a desired 2,4-dimethyl-6-alkyl-phenol by first forming an addition product thereof with a portion of such desired 2,4-dimethyl-6-alkyl-phenol, separating from other materials, and then alkylating with an alkylating agent corresponding to the alkyl radical of said desired 2,4-dimethyl-6-alkyl-phenol.

In a substantially identical manner other addition products may be formed, separated and reacted in accordance with the present invention. For example, in another preferred embodiment of the present invention, 2,4-dimethyl phenol may be employed to form an addition product with meta cresol in a mixture of cresols, or meta cresol may be employed to form an addition product with 2,4-xylenol in a mixture of xylenols, and the addition product, as produced in either case, separated and treated or reacted to produce a derivative thereof, for example it may be butylated to form a mixture of 2,4-dimethyl-6-tertiary-butylphenol and 2,4-ditertiarybutyl-5-methylphenol, which products are easily separable and both valuable.

As above stated, a further preferred embodiment of the present invention is the formation of an addition product between an aromatic compound from which a desired derivative is to be prepared and a material which is substantially inert in the subsequent treatment or reaction. The formation of an addition product between meta cresol, which may be contained in a mixture of cresols, and urea illustrates this embodiment. The meta cresol-urea addition product separates from the mixture in the form of crystals which may be separated by filtration, or other suitable means, and the addition product treated or reacted to form a derivative of the meta cresol.

which derivative is easily separable from the urea, and the urea may be recycled in the process. In a substantially identical manner para cresol may be separated from mixtures of cresols by forming an addition product with oxalic acid, the addition product separated and reacted or treated to form the desired derivative of para-cresol. The derivative is then separated from the oxalic acid, which may be recycled in the process. A special advantage of such processes, in accordance with the present invention, is the fact that the non-aromatic constituent of the addition product may serve as a catalyst in the reaction employed to produce the desired derivative. For example, in the above process oxalic acid catalyzes the alkylation of para cresol.

The present invention may be better understood from a consideration of the accompanying drawing which is made a part of this specification and in which the sole figure is a flow diagram representing one embodiment of the invention. Referring to the drawing, an aromatic mixture including as components thereof the aromatic compound A, whose derivative A' is the desired product, and at least one other component B, is fed into mixer 1 via line 2, and additament C, capable of forming an addition product with A, is fed into the mixer via line 3. The mixture may conveniently be heated while in the mixer as by means of steam introduced into a heating jacket 4. The mixture of A, B and C is transferred via line 5 to cooling vessel 6, adapted to be cooled by any suitable means where the addition product A·C is formed. The mixture of A·C and B is passed via line 8 into a separator 9, such as a centrifugal filter. B is separated from the addition product A·C and removed via line 10. B may be recycled to mixer 1 via line 7, since it may be employed as a diluent, and may contain some unreacted A or C which may be recovered by recycling. The addition product A·C is transferred via line 11 into a reactor 12 and reactant D is introduced therein via line 13. Compound A, from the addition product A·C, and reactant D react to form the desired derivative A', and the mixture of A' and C is passed via lines 14 and 15 into a separator 16 wherein the desired derivative A' is separated and removed via line 17. Separated additament C is recycled to the mixer via lines 18 and 3. In the preferred process of the present invention, the desired derivative A' is identical with additament C, so that, in this case, the product from the reactor 12 is the pure material A' (or C), so that the desired derivative may be taken directly from the reactor via lines 14 and 20, or all or any part thereof may be directly recycled via lines 19, 18 and 3.

For purposes of simplicity, heat exchangers, pumps, temperature controls, and control means, the proper placement of which is evident to those skilled in the art, have been largely omitted.

It is now evident that the process of the present invention may be employed when an aromatic compound, a derivative of which is the desired product, forms or can be made to form an addition product with a selected additament, which addition product separates or can be separated from whatever other components may be present including adducts between other mixture components and the additament which may be formed under some reaction conditions. The present invention may be applied to the preparation of desired derivatives of various aromatic compounds, such as derivatives of the ethyl, propyl, butyl, amyl and hexyl homologues of the herein described methyl and polymethyl phenols, naphthylamines and alkylated naphthylamines, toluidines, benzonitrile and alkylated benzonitrile, such as 2,4-dimethyl benzonitrile, or homologues thereof, such as the ethyl, propyl, butyl, amyl and hexyl homologues, benzoic acid, alkylated benzoic acid, such as 2,4-dimethylbenzoic acid, xylidines, picolines, and the like. In general, the aromatic derivatives contemplated by the present invention are prepared from aromatic compounds having attached to the aromatic ring a polar group, such as the —OH, —NH$_2$, —CN, and —COOH groups, since these compounds generally readily react to form addition compounds with suitable additaments, and such compounds commonly occur in mixtures of materials from which they may be separated only with difficulty by the usual procedures. The additament may also advantageously be an aromatic compound containing a similar polar group attached to the aromatic nucleus, but may belong to other classes of compounds, as herein described. The above-mentioned polar compounds, which may be separated from mixtures containing them and treated in accordance with the present invention, may also be employed as additaments for forming addition products with other polar compounds. Thus, preferred additaments for forming addition products with 2,4-xylenol are the 2,4,6-trialkylphenols, and generally preferred additaments for forming addition products with 2,4-dialkyl phenols are the 2,4,6-trialkylphenols wherein preferably no alkyl group contains more than 6 carbon atoms. Other polar compounds, as above-described, may be employed with good results, and still other additament materials, as herein described, may be employed. In a similar manner, preferred additaments for separating polar aromatic compounds, and especially those polar compounds containing substituent alkyl groups in the 2 and 4 positions, are the 2,4-dimethyl-6-alkylphenols, or generally the 2,4,6-trialkylphenols wherein preferably no alkyl group contains more than 6 carbon atoms, but other polar compounds, as above-described, may be employed with goods results, and still other additament materials as herein described, may be employed. In general, preferred additaments for separating alkyl phenols are other alkyl phenols having a different number of substituent alkyl groups, wherein none of the alkyl groups contain more than 6 carbon atoms, such as the employment of a mono-, tri-, or tetraalkyl phenol, or homologues thereof, to separate a dialkyl phenol.

In general, a solid addition compound or product will be formed by the process of the present invention, which may be separated by filtration, or the like, but in some instances a liquid addition product, immiscible in the mixture, may be produced, which also may be separated and treated as described. It is preferred to carry out the process of the present invention so that only the aromatic compound, the derivative of which is desired, will form an addition product with the added component. However, in some instances two or even more addition products may be formed, especially where complex multi-component mixtures are involved. The formation of undesired addition products may be largely eliminated by proper choice of the amount of the component added (additament) to form the addition product (adduct), and by proper temperature control during the formation of the addition products. Even if such undesired addition products are formed, they usually do not interfere with the present process, and the desired derivatives may be formed and is easily separable from the reaction mixture. Where desirable, a diluent may be employed, for example where filtration or other separation of the addition product would otherwise be difficult.

The following specific examples are presented to further illustrate the present invention, which is not to be considered as limited thereby.

*Example I*

Two hundred fifty parts by weight of a mixture containing various xylenols, including 2,3-xylenol, 2,5-xylenol 2,6-xylenol, 3,5-xylenol, and containing about 55-60% by weight of 2,4-xylenol was mixed with about 200 parts by weight of 2,4-dimethyl-6-tertiary-butylphenol. The mixture was warmed slightly and then allowed to cool to room temperature. About 200 parts by weight of crystals of the addition product of 2,4-xylenol and 2,4-dimethyl-6-tertiary-butylphenol formed at room temperature and was recovered by centrifugation. The yield may be increased by cooling to lower temperatures. This addition product represents a new composition of matter from which the two components may be recovered, as by distillation, or which may be reacted or treated to form derivatives of either, or of both, of the components. The addition product was recrystallized from isooctane and the melting point determined as 45.7° C.

The addition product may be butylated by melting and contacting with isobutylene in the presence of a small amount of sulfuric acid catalyst to form substantially pure 2,4-dimethyl-6-tertiary-butylphenol.

*Example II*

One thousand parts by weight of a mixture of xylenols, as described in Example I, containing about 65% of 2,4-xylenol was mixed with about 950 parts by weight of 2,4-dimethyl-6-tertiary-butylphenol, which corresponds to a mol ratio of one to one of 2,4-xylenol to 2,4-dimethyl-6-tertiary-butylphenol. The mixture was warmed and the homogeneous liquid mass then cooled to yield about 920 parts by weight of the addition product at 20° C. which was separated by centrifugation. On cooling the residual liquid mixture to 15° C. an additional quantity (about 75 parts by weight) of the addition product was recovered, but further cooling did not yield additional significant quantities of the desired addition product.

About one hundred parts by weight of the product (adduct) was heated to 90° C. and contacted with about 20 parts by weight of isobutylene in the presence of one part by weight of 96% sulfuric acid. The reaction was carried out at constant volume, the temperature being held at about 90° C. About 100 parts by weight of 2,4-dimethyl-6-tertiary-butyl phenol was recovered, indicating a conversion of about 70%. Higher conversion may be obtained by employing an excess of isobutylene in the reaction.

*Example III*

About thirty-five parts by weight of a mixture of xylenols containing about 60% of 2,4-xylenol was mixed with a quantity of cineole sufficient to form an addition compound containing 2 molecules of the 2,4-xylenol to one of the cineole. The mixture was warmed and then cooled to about −10° C. and about 15 parts by weight of the solid addition product recovered by centrifugation. This addition product may be treated or reacted to form a derivative of the 2,4-xylenol, while the cineole remains substantially unaffected, and the derivative separated therefrom. The cineole may be recycled in the process to form more addition product.

When desired, the addition product of cineole and 2,4-xylenol may be treated to form valuable derivatives of both 2,4-xylenol and cineole in the same operation, which derivatives may be easily separated, as by distillation.

The invention claimed is:

1. As a new composition of matter, a solid addition product of a dialkyl phenol with another alkylphenol having a different number of substituent alkyl groups, said addition product being selected from the group consisting of a solid addition product of 2,4-xylenol and meta-cresol and a solid addition product of 2,4-xylenol and 2,4-dimethyl-6-tertiary-butylphenol.

2. As a new composition of matter, a solid addition product of 2,4-xylenol and meta-cresol.

3. As a new composition of matter, a solid addition product of 2,4-xylenol and 2,4-dimethyl-6-tertiary-butylphenol.

4. The process of preparing derivatives of 2,4-xylenol from mixtures of xylenols including as a component thereof 2,4-xylenol, which comprises mixing said mixture of xylenols with 2,4-dimethyl-6-tertiary-butylphenol and forming an addition product of 2,4-xylenol and 2,4-dimethyl-6-tertiary-butylphenol, separating said addition product from the other substances of the admixture, butylating said addition product to form substantially pure 2,4-dimethyl-6-tertiary-butylphenol, and recycling a portion of the 2,4-dimethyl-6-tertiary-butylphenol to form additional addition product.

5. The process of preparing alkyl derivatives of 2,4-xylenol from mixtures of xylenols including as a component thereof 2,4-xylenol, which comprises mixing said mixture of xylenols with 2,4-dimethyl-6-tertiary-butylphenol and forming an addition product of 2,4-xylenol and 2,4-dimethyl-6-tertiary-butylphenol, separating said addition product from the other substances of the admixture, alkylating said addition product with an alkylating agent for phenols and having from 1 to 6 carbon atoms to form the desired alkyl derivative, recovering the 2,4-dimethyl-6-tertiary-butylphenol from the resulting reaction mixture and recycling at least a portion of the 2,4-dimethyl-6-tertiary-butylphenol to form additional addition product.

6. A process for the production of a desired alkyl phenol compound of the general formula:

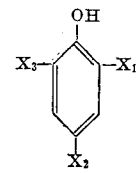

wherein $X_1$, $X_2$ and $X_3$ each represent an alkyl group of from 1 to 6 carbon atoms, which comprises mixing a multi-component system containing as a component thereof an alkyl phenol compound of the general formula:

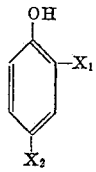

wherein $X_1$ and $X_2$ each represent an alkyl group as above defined, with an alkyl phenol additа- ment capable of forming an addition product therewith, separating said addition product from other substances in the resulting admixture, alkylating said addition product to form the desired compound, separating the desired compound and recycling at least a portion of said additament to form additional addition product with said alkyl phenol of the general formula

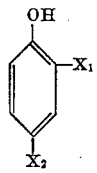

as described hereinbefore.

7. A process for separating 2,4-xylenol from a mixture of xylenols containing as a component thereof 2,4-xylenol, which comprises adding to said mixture 2,4 - dimethyl - 6 - tertiary - butyl - phenol, forming a solid addition product of 2,4-xylenol and 2,4-dimethyl-6-tertiary-butyl-phenol and separating said solid addition product from the resulting admixture.

8. A process for separating 2,4-xylenol from a mixture of xylenols containing as a component thereof 2,4-xylenol which comprises adding to said mixture 2,4-dimethyl-6-alkyl phenol, forming a solid addition product of 2,4-xylenol and said 2,4-dimethyl-6-alkyl phenol and separating said solid addition product from the resulting admixture.

9. The process of preparing derivatives of 2,4-xylenol from a mixture of xylenols including as a component thereof 2,4-xylenol, which comprises mixing said mixture of xylenols with a 2,4-dimethyl-6-alkyl phenol capable of forming a solid addition product with 2,4-xylenol and forming an addition product of 2,4-xylenol with said 2,4-dimethyl-6-alkyl-phenol, separating said addition product from the other substances of the admixture, alkylating said addition product with an alkylating agent which yields an alkyl group identical with said alkyl group present in the 2,4-dimethyl-6-alkyl phenol, to form substantially pure 2,4-dimethyl-6-alkyl-phenol, and recycling a portion of the 2,4-dimethyl-6-alkyl phenol to form additional addition product.

10. A process for the preparation of a desired 2,4-dimethyl-6-alkyl phenol from a mixture of xylenols containing 2,4-xylenol which comprises; adding cineole to said mixture; forming a solid addition product of 2,4-xylenol with cineole; alkylating said addition product with an alkylating agent which yields an alkyl group identical with the alkyl group present in said desired 2,4-dimethyl-6-alkyl phenol; separately recovering from the resulting reaction mixture substantially pure said desired 2,4-dimethyl-6-alkyl phenol and substantially pure cineole and recycling at least a portion of the recovered cineole to form additional solid addition product.

11. A process for the preparation of a desired 2,4,6-trialkylphenol derivative of a 2,4-dialkyl phenol which comprises; adding to a multi-component system containing as a component thereof a 2,4-dialkyl phenol whose derivative is desired, a 2,4,6-trialkyl phenol in which the 2- and 4- alkyl radicals are identical respectviely, with those of said 2,4-dialkyl phenol, no alkyl group in said 2,4-dialkyl phenol and 2,4,6-trialkyl phenol having more than 6 carbon atoms; forming a solid addition product of said 2,4-dialkyl phenol with said 2,4,6-trialkyl phenol; separating said solid addition product; alkylating said solid addition product with an alkylating agent for phenols and having not more than 6 carbon atoms; recovering from the resulting reaction mixture said desired alkyl derivative of 2,4-dialkyl phenol and recycling at least a portion of said 2,4,6-trialkyl phenol to form additional solid addition product.

12. The process of preparing derivatives of a methyl phenol which comprises: mixing a multi-component system containing as a component thereof a 2,4-dialkyl phenol wherein at least one of the alkyl groups is a methyl group, the remaining alkyl group containing from 1 to 6 carbon atoms, with a 2,4,6-trialkyl phenol wherein the 2- and 4- alkyl radicals are identical respectively with those of said 2,4-dialkyl phenol and wherein the alkyl group in the 6- position contains from 1 to 6 carbon atoms; forming an addition product of said 2,4-dialkyl phenol and said 2,4,6-trialkyl phenol; separating said addition product from the other substances in the resulting admixture; alkylating said addition product with an alkylating agent which yields an alkyl group identical with said alkyl group present in the 6- position of said 2,4,6-trialkyl phenol, so as to form substantially pure said 2,4,6-trialkyl phenol; separating at least a portion of said 2,4,6-trialkyl phenol from the reaction mixture and recycling said portion of said 2,4,6-trialkyl phenol to form additional addition product with a further portion of said 2,4-dialkyl phenol.

13. A process for the preparation of a desired 2,4,6-trialkyl phenol derivative of a 2,4-dialkyl phenol which comprises: adding to a multi-component system containing as a component thereof a 2,4-dialkyl phenol whose derivative is desired, an oxygen-containing aromatic compound selected from the group consisting of cineole and a 2,4,6-trialkyl phenol in which the 2- and 4- alkyl radicals are identical respectively with those of said 2,4-dialkyl phenol, no alkyl group in said 2,4-dialkyl phenol and 2,4,6-trialkyl phenol having more than 6 carbon atoms; forming a solid addition product of said 2,4-dialkyl with said oxygen-containing aromatic compound; separating said solid addition product; alkylating said solid addition product with an alkylating agent for phenols and having not more than 6 carbon atoms; recovering from the resulting reaction mixture said desired alkyl derivative of 2,4-dialkyl phenol and recycling at least a portion of said oxygen-containing aromatic compound to form additional solid addition product with a further amount of said 2,4-dialkyl phenol.

DANIEL B. LUTEN, JR.
ALDO DE BENEDICTIS.

REFERENCES CITED

The following references are of record in the file of this patent:

UNITED STATES PATENTS

| Number | Name | Date |
|---|---|---|
| 1,830,859 | Schotte et al. | Nov. 10, 1931 |
| 1,980,384 | Comte | Nov. 13, 1934 |
| 1,980,385 | Comte | Nov. 13, 1934 |
| 1,980,901 | Bentley et al. | Nov. 13, 1934 |
| 2,042,331 | Carswell | May 26, 1936 |
| 2,321,036 | Luten, Jr., et al. | June 8, 1943 |
| 2,432,064 | Cislak et al. | Dec. 2, 1947 |
| 2,435,087 | Luten, Jr., et al. | Jan. 27, 1948 |

OTHER REFERENCES

Morgan et al., Jour. Soc. Chem. Ind., vol. 54, 19T–25T (1935). (Patent Office Library.)

Fields et al., Ind. Eng. Chem., vol. 32, 489–96 (1940). (Patent Office Library.)